US010260281B2

(12) United States Patent
Ng

(10) Patent No.: US 10,260,281 B2
(45) Date of Patent: Apr. 16, 2019

(54) ROLLER BLIND CLUTCH COVER WITH ADJUSTABLE CHAIN GUIDE

(71) Applicant: ZMC Metal Coating Inc., Woodbridge (CA)

(72) Inventor: Philip Ng, Thornhill (CA)

(73) Assignee: ZMC Metal Coating Inc., Woodbridge (CA)

( * ) Notice: Subject to any disclaimer, the term of this patent is extended or adjusted under 35 U.S.C. 154(b) by 147 days.

(21) Appl. No.: 15/366,217

(22) Filed: Dec. 1, 2016

(65) Prior Publication Data

US 2017/0226798 A1 Aug. 10, 2017

Related U.S. Application Data

(60) Provisional application No. 62/291,017, filed on Feb. 4, 2016.

(51) Int. Cl.
| | | |
|---|---|---|
| *E06B 9/56* | (2006.01) |
| *E06B 9/68* | (2006.01) |
| *E06B 9/58* | (2006.01) |
| *F16D 23/00* | (2006.01) |
| *E06B 9/50* | (2006.01) |
| *E06B 9/90* | (2006.01) |
| *E06B 9/78* | (2006.01) |
| *E06B 9/24* | (2006.01) |
| *E06B 9/40* | (2006.01) |

(52) U.S. Cl.
CPC .......... *E06B 9/68* (2013.01); *E06B 9/50* (2013.01); *E06B 9/58* (2013.01); *E06B 9/90* (2013.01); *F16D 23/00* (2013.01); *E06B 9/78* (2013.01); *E06B 2009/2452* (2013.01); *E06B 2009/402* (2013.01); *E06B 2009/405* (2013.01); *E06B 2009/785* (2013.01); *E06B 2009/905* (2013.01); *F16D 2300/12* (2013.01); *F16D 2300/26* (2013.01)

(58) Field of Classification Search
None
See application file for complete search history.

(56) References Cited

U.S. PATENT DOCUMENTS

| 4,372,432 A * | 2/1983 | Waine ................. E06B 9/78 160/307 |
| 6,739,373 B1 * | 5/2004 | Liu ..................... E06B 9/42 160/321 |

(Continued)

*Primary Examiner* — Charles A Fox
*Assistant Examiner* — Ryan P Dodd
(74) *Attorney, Agent, or Firm* — Honigman LLP

(57) ABSTRACT

A clutch cover for a roller blind clutch. The clutch cover comprises a clutch barrel portion mounted upon and extending outwardly from a first side of a backing plate, a cover ring and one or more indexing locators to fix the position of the cover ring relative to the backing plate when the cover ring is releasably secured about the backing plate. The cover ring includes a chain guide and is releasably securable about the backing plate such that the cover ring encompasses the backing plate. The indexing locators prevent relative rotational movement between the cover ring and the backing plate when the cover ring is releasably secured about the backing plate. The indexing locators permit the chain guide to be positioned at a plurality of angles relative to the backing plate.

6 Claims, 7 Drawing Sheets

(56) References Cited

U.S. PATENT DOCUMENTS

| | | | | |
|---|---|---|---|---|
| 7,931,069 B2 * | 4/2011 | Cannaverde | ............... | E06B 9/38 |
| | | | | 160/170 |
| 8,136,569 B2 * | 3/2012 | Bohlen | ................ | E06B 9/42 |
| | | | | 160/323.1 |
| 9,222,305 B2 * | 12/2015 | Di Stefano | ............... | E06B 9/68 |
| D775,939 S * | 1/2017 | Ng | ................ | D8/380 |
| 9,850,704 B2 * | 12/2017 | Jang | ................ | E06B 9/56 |
| 2010/0288451 A1 * | 11/2010 | Bohlen | ................ | E06B 9/88 |
| | | | | 160/291 |
| 2015/0376941 A1 * | 12/2015 | Fujita | ................ | E06B 9/26 |
| | | | | 160/241 |

\* cited by examiner

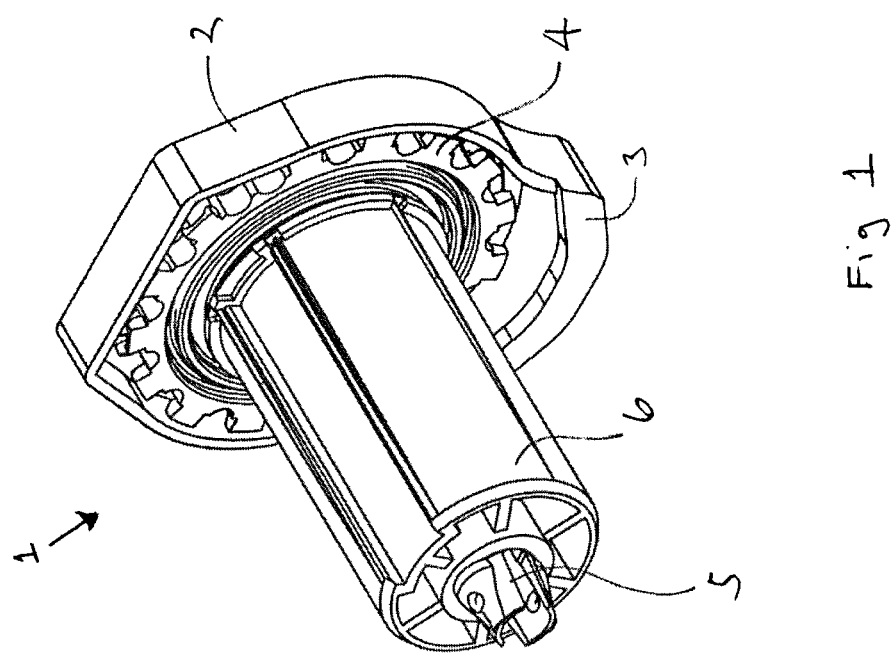

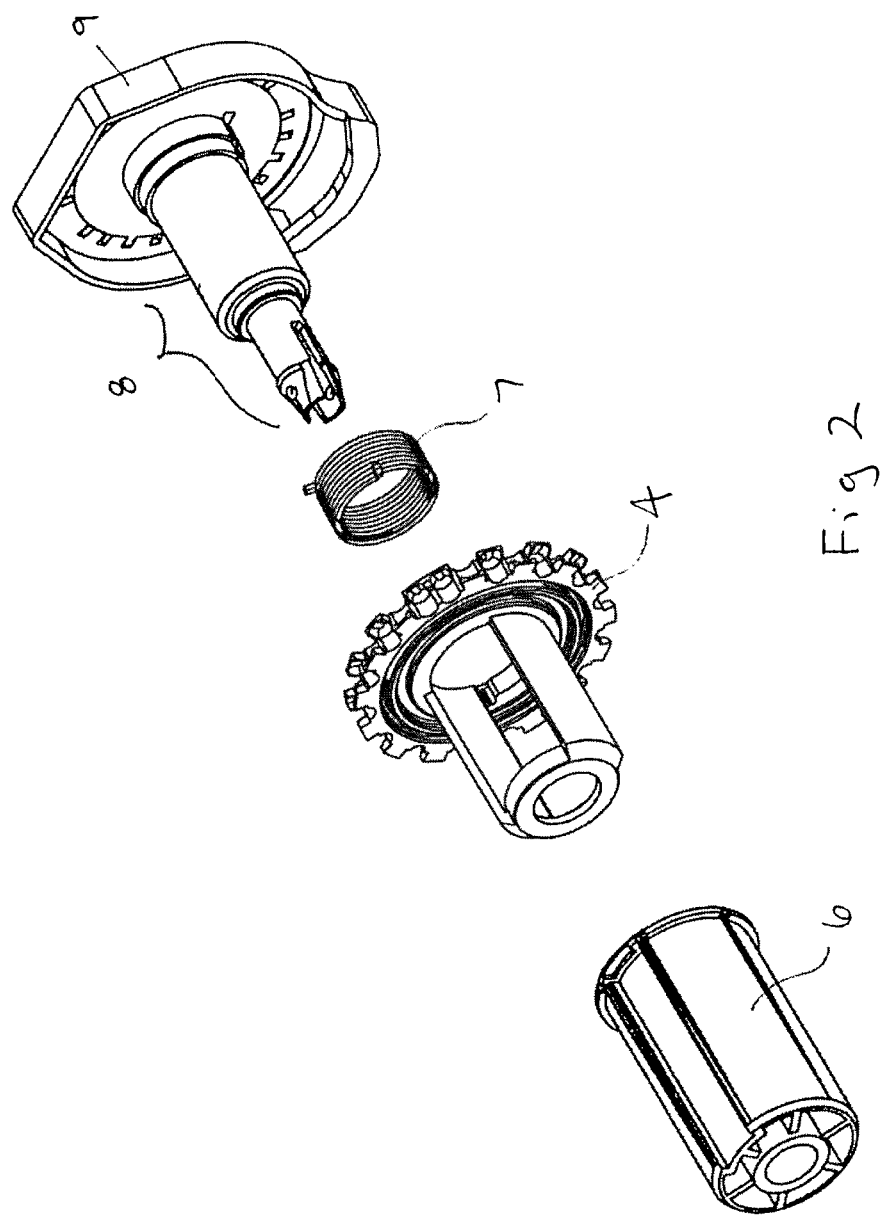

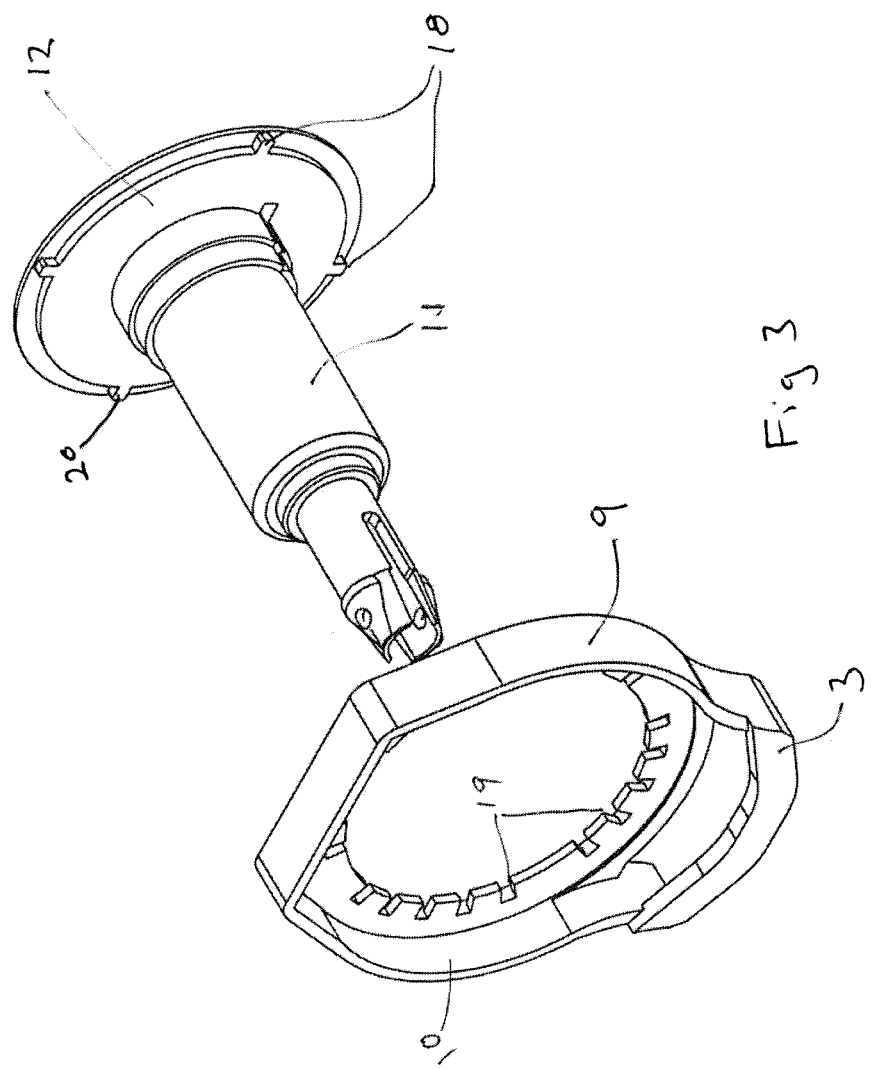

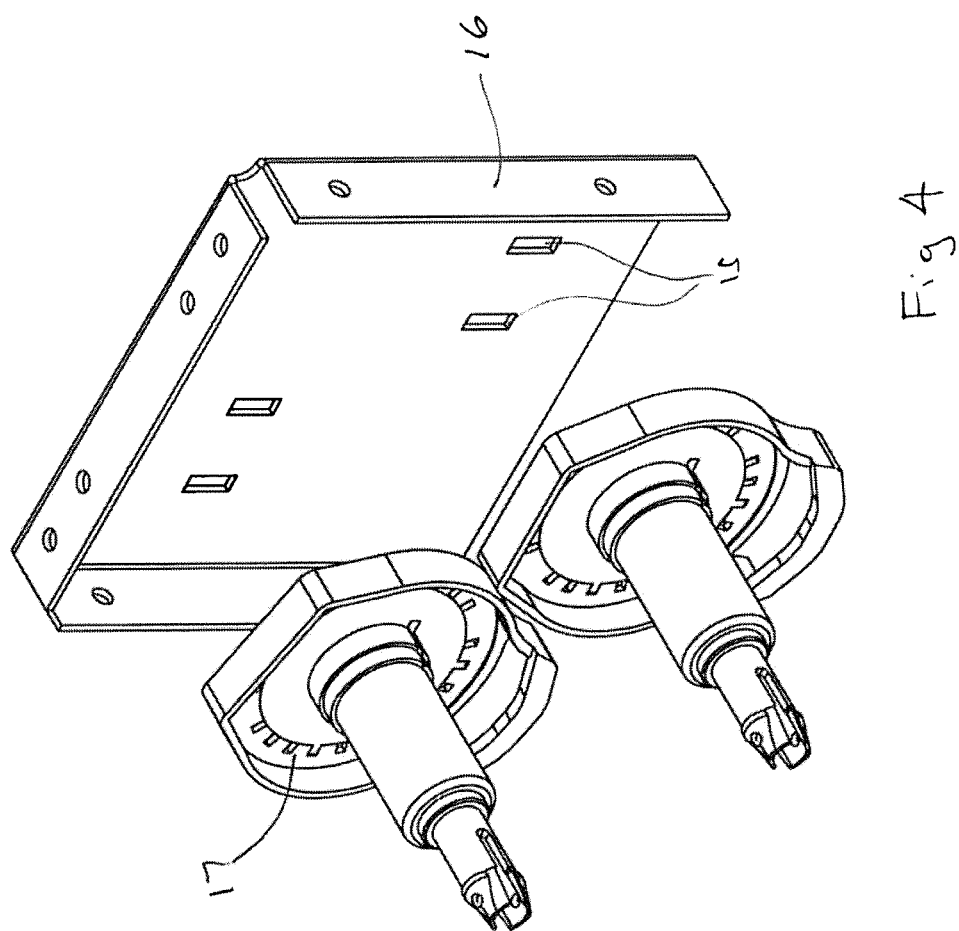

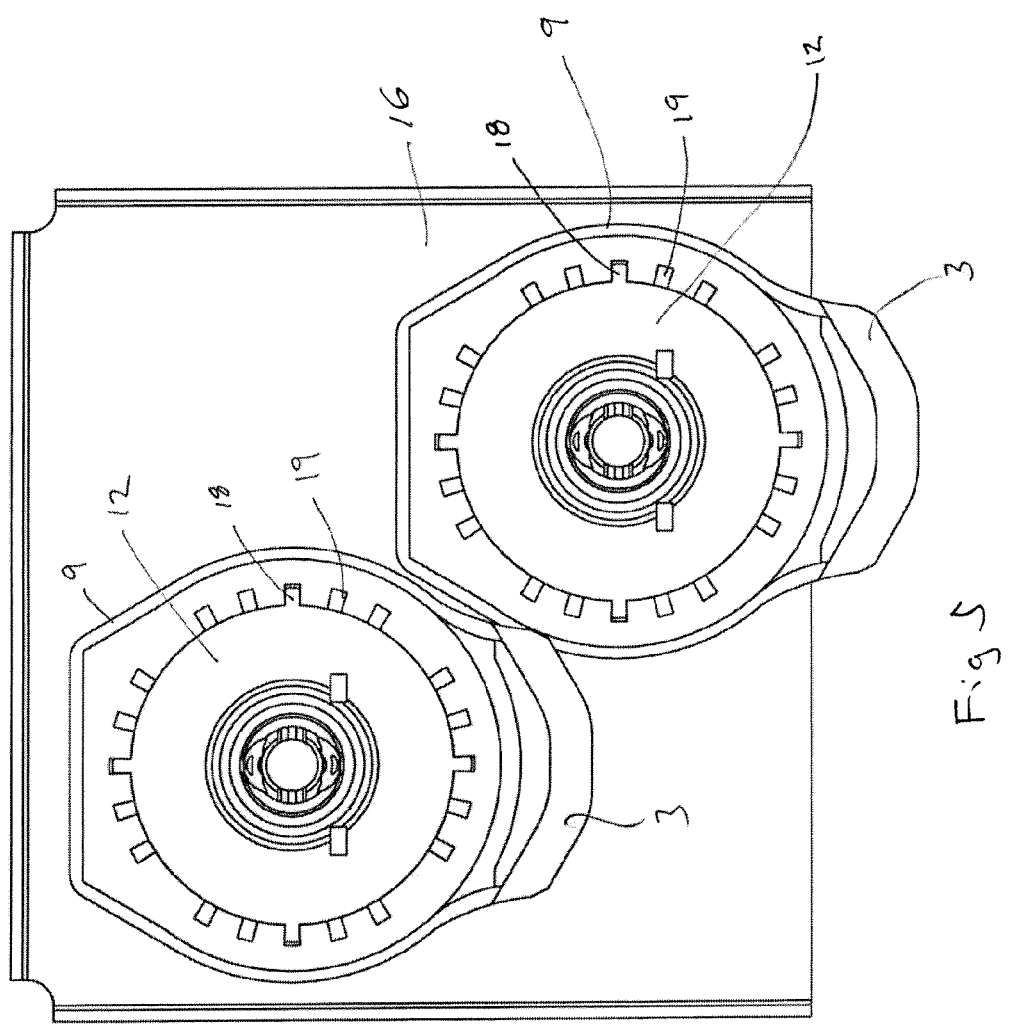

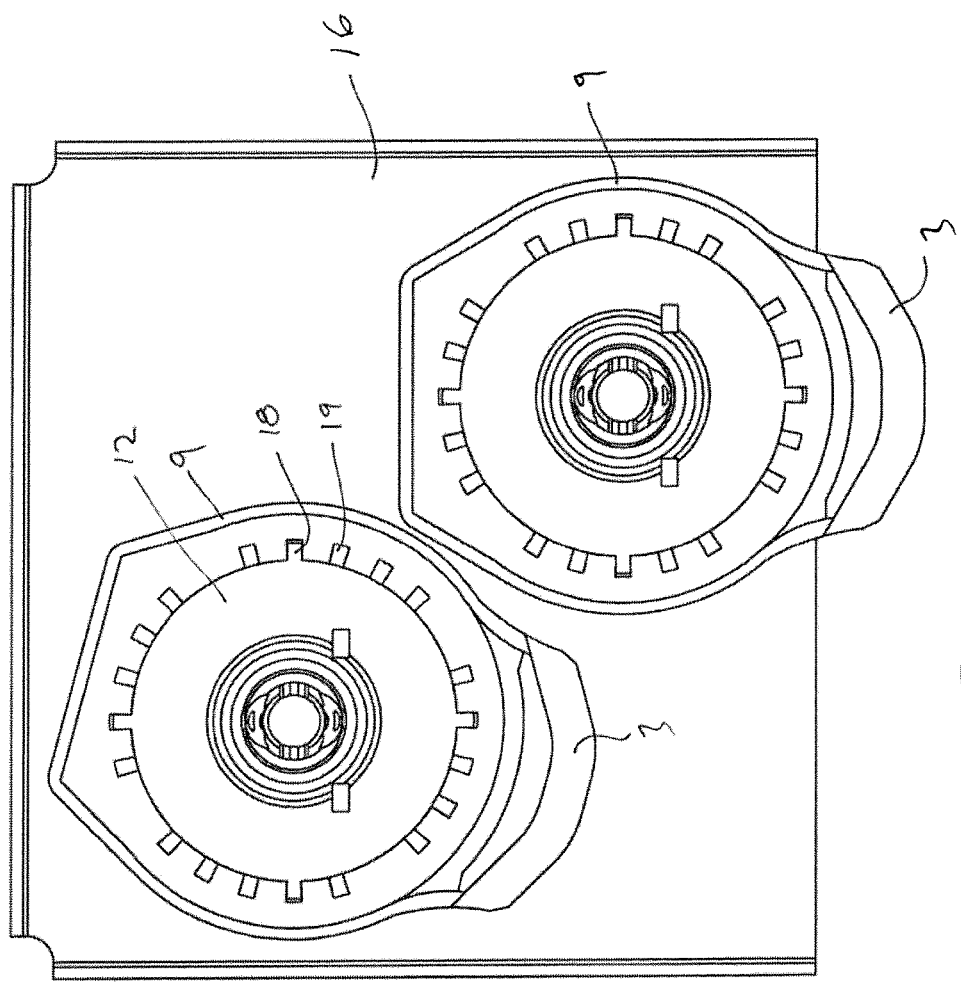

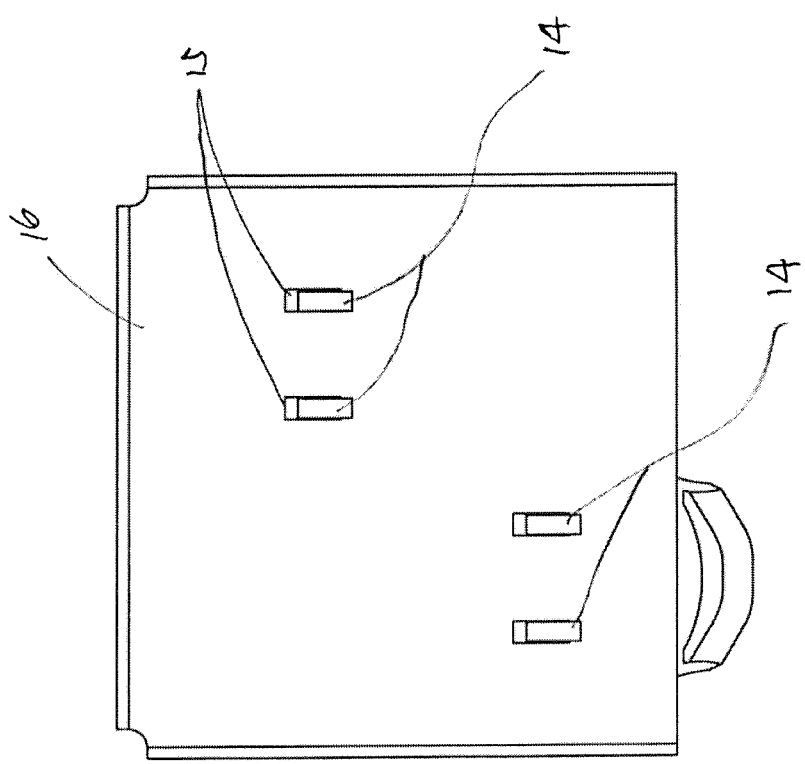

ROLLER BLIND CLUTCH COVER WITH ADJUSTABLE CHAIN GUIDE

CROSS-REFERENCE TO RELATED APPLICATIONS

This U.S. patent application claims priority to U.S. Provisional Application 62/291,017 filed on Feb. 4, 2016 the disclosure of which is considered part of the disclosure of this application and is hereby incorporated by reference in its entirety.

FIELD

This invention relates generally to roller blinds, and in particular to a roller blind clutch cover having an adjustable chain guide.

BACKGROUND

Roller blinds are common forms of window coverings that are used to limit light intrusion, for privacy purposes, to aid in insulating, and to generally enhance the esthetics of a window. Typically, roller blinds have a clutch mechanism at one end that drives a roller tube onto which blind fabric or material is wound or unwound. Commonly the clutch is operated through pulling on one end of a looped chain or cord that is received around a clutch drive sprocket. In many instances the exterior of the clutch includes a cover which serves the purpose of helping to obscure the clutch drive sprocket and much of the internal mechanisms of the clutch in order to present a sleek and generally more pleasing appearance. The clutch cover also commonly includes a chain or cord guide. The chain guide serves to direct or "guide" the chain or cord about the drive sprocket so as to help retain the chain or cord in position, and also to help prevent objects from becoming entangled or interfering with the operation of the drive sprocket. Roller blind clutch chain guides also in many instances contain structures that help to direct the chain or cord downwardly and away from the sprocket for accessing by an operator.

For ease of manufacture, and to help minimize costs, clutch chain guides have traditionally been formed together with the clutch barrel as a unitary part. In such instances the clutch barrel extends from one side of the cover with the opposite side of the cover incorporating hooks or other mechanisms to enable the clutch to be secured to an end bracket of the roller blind. Construction of the clutch cover, chain guide, clutch barrel, and the hooks or fastening mechanisms used to secure the clutch to the end bracket as a unitary component also helps to assist in the transference of rotational torque, that may be applied by operation of the clutch, through the barrel to the cover and ultimately to the end bracket.

Unfortunately, the above form of clutch cover allows the chain guide to orient the chain or cord in only a single manner when the clutch cover or chain guide is secured to the end bracket. In the case of a single blind, that limitation does not usually present concern. However, more recently the use of a dual blind shade, having two roller blinds mounted within one set of end brackets, has become more common. In such cases, it may be desirable for the chain or cord of one of the blinds to be directed outwardly and away from the cord or chain of the other blind held within the same pair of end brackets in order to help reduce tangling or contact between the two sets of chains or cords. Current clutch covers do not readily permit an off-setting of the chains or cords in a dual blind situation.

To account for the heat and frictional forces to which the clutch may be subjected during operation, the clutch barrel must typically be formed from a relatively strong material capable of functioning at elevated temperatures. Such materials often tend to be somewhat brittle, meaning that the barrel and clutch cover/chain guide can break should the roller blind be dropped during or prior to installation. In addition, it is generally desirable for the entire roller blind to be as silent as possible during operation. Contact between the chain or cord and the chain guide during operation of the clutch can cause undesirable noise. Where the chain guide, clutch cover and the clutch barrel are of unitary construction, the chain guide and cover will be of the same, relatively strong, thermally tolerant, material, from which the barrel is made, which in many instances can result in the generation of significant noise through contact with the chain or cord.

SUMMARY

In one aspect the invention provides a clutch cover for a roller blind clutch, the clutch cover comprising a clutch barrel portion mounted upon and extending outwardly from a first side of a backing plate, one or more clutch mounts operatively associated with an opposite side of said backing plate, a cover ring, said cover ring including a chain guide, said cover ring releasably securable about said backing plate such that said cover ring encompasses said backing plate; and one or more indexing locators to fix the position of said cover ring relative to said backing plate when said cover ring is releasably secured about said backing plate, said indexing locators preventing relative rotational movement between said cover ring and said backing plate when said cover ring is releasably secured about said backing plate, said indexing locators permitting said chain guide to be positioned at a plurality of angles relative to said backing plate.

In another aspect the invention concerns a clutch cover for a roller blind clutch, the clutch cover comprising a backing plate having first and second sides, said first side adapted to receive or having extending therefrom a clutch barrel portion, said second side adapted to receive or having extending therefrom one or more clutch mounts to releasably secure said backing plate to an end plate of the roller blind, a cover ring, said cover ring including a chain guide, said cover ring releasably securable about said backing plate such that said cover ring encompasses said backing plate; and one or more indexing locators to fix the position of said cover ring relative to said backing plate when said cover ring is releasably secured about said backing plate, said indexing locators preventing relative rotational movement between said cover ring and said backing plate when said cover ring is releasably secured about said backing plate, said indexing locators permitting said chain guide to be positioned at a plurality of angles relative to said backing plate.

BRIEF DESCRIPTION OF THE DRAWINGS

For a better understanding of the present invention, and to show more clearly how it may be carried into effect, reference will now be made, by way of example, to the accompanying drawings which show exemplary embodiments of the present invention in which:

FIG. 1 is an upper side perspective view of a typical roller blind clutch having mounted upon its clutch barrel a roller tube drive coupling.

FIG. 2 is an exploded view of a roller blind clutch having a clutch cover and chain guide constructed in accordance with an embodiment of the invention.

FIG. 3 is an exploded view of the clutch barrel and clutch cover/chain guide of an embodiment of the present invention.

FIG. 4 is a partially exploded view of a pair of clutch barrels with their associated chain covers/chain guides in accordance with the embodiment of the invention prior to connection to an end bracket.

FIG. 5 is a side elevational view similar to FIG. 4 wherein the clutch barrels and their associated chain covers/chain guides have been secured to the end bracket with both chain guides oriented generally vertically.

FIG. 6 is a view similar to FIG. 5 wherein the upper chain guide has been offset from the position shown in FIG. 4 such that it is oriented at an angle to the vertical.

FIG. 7 is a rear view of the structure shown in FIG. 6.

DESCRIPTION

The present invention may be embodied in a number of different forms. The specification and drawings that follow describe and disclose some of the specific forms of the invention.

FIG. 1 shows a somewhat traditional roller blind clutch 1, having a clutch cover 2, a chain guide 3, a drive sprocket 4, a clutch barrel 5 and a roller tube drive coupling 6. In its assembled state (as shown) the drive sprocket 4 is received within the clutch cover 5, with the roller tube drive coupling 6 mounted over the clutch barrel 5. Rotational movement, applied to drive sprocket 4 through the operation of a cord or chain (not shown) wrapped around the drive sprocket, has the effect of rotating roller tube drive coupling 6 in one direction or the other. When fully assembled within a roller blind, the roller tube drive coupling is seated within the blind's roller tube such that rotation of the drive coupling causes blind fabric to be wound or unwound from the roller tube.

FIG. 2 is an exploded view of a clutch similar to that shown in FIG. 1, wherein the clutch cover is constructed in accordance with an embodiment of the present invention. In this instance the clutch spring 7 is now visible and, as will be appreciated from an understanding of the invention as described below, clutch cover 2 is formed from two primary components, namely, a barrel portion 8 and a cover ring 9.

With specific reference to FIG. 3, the nature of clutch cover 2, and its primary components barrel portion 8 and cover ring 9, is shown in additional detail. Here, it will be appreciated that cover ring 9 includes chain guide 3, and in that particular embodiment that the cover ring and chain guide are of unitary construction. It will, however, be appreciated that in alternate embodiments the chain guide portion could be constructed as a separate and distinct component that is fastened or otherwise adhered to the cover ring. It will also be appreciated that the particular structure of the chain guide could vary from that shown in the attached figures. The function of the chain guide is similar to that of chain guides used in association with other roller blind clutches, and in particular serves to help direct the clutch chains or cords downwardly from the roller blind in a uniform fashion. It will also be noted that cover ring 9 includes a circumferential flange 10 that serves to encompass drive sprocket 4 when the clutch is fully assembled.

Barrel portion 8 of clutch cover 2 is comprised generally of the clutch "barrel" 11 about which clutch spring 7, drive sprocket 4, and ultimately roller tube drive coupling 6, are mounted and rotate. In that regard barrel 11 effectively acts as the clutch's axle and can be any one of a wide variety of different physical structures that are commonly in use in roller blind clutches. In accordance with an embodiment of the invention, barrel portion 8 of clutch cover 2 further includes a backing plate 12 having a first side upon which barrel 11 is mounted or fixedly secured. While not completely necessary, it is expected that in most instances barrel 11 and backing plate 12 will be of unitary construction. The opposite side of backing plate 12 will typically include one or more clutch mounts that are used to physically mount and secure clutch 11 to an end bracket of the roller blind. One embodiment of clutch mounts is shown in FIGS. 4 and 7. Other embodiments are possible while remaining within the broad scope of the invention. In the embodiment shown in FIGS. 4 and 7, the clutch mounts comprise a pair of hooks 14 that extend outwardly from the rear surface of backing plate 12. Hooks 14 may then be received within a pair of slots 15 within end bracket 16 to secure the clutch to the end bracket. It will be appreciated that the interaction of hooks 14 and slots 15 not only secure clutch 1 to end bracket 16, but also permit torque applied to the clutch to be accommodated by end bracket 16. Those ordinarily skilled in the art will appreciate that for the form of roller blind clutch depicted in the attached drawings and described herein barrel 11 is required to be fixed in place and generally prevented from rotating.

With reference to FIGS. 3 and 4, in an embodiment of the invention, clutch cover 2 further includes one or more indexing locators 17 that serve to locate and fix the position of cover ring 9 relative to barrel portion 8 and backing plate 12 when the cover ring is releasably secured about the backing plate. The indexing locators prevent relative rotational movement between cover ring 9 and backing plate 12 and further permit chain guide 3 to be positioned at an angle relative to vertical when clutch 1 is secured to end bracket 16 through the interaction of hooks 14 with slots 15. In the embodiment of the invention shown in the attached drawings, clutch cover 8 includes a plurality of indexing locators that permit chain guide 3 to be positioned at a number of different pre-determined angular orientations. Further, in the attached drawings indexing locator 17 comprises a plurality of tabs 18 and receivers 19. In the attached figures tabs 18 are positioned about backing plate 12 with receivers 19 formed within cover ring 9. It should be appreciated that the relative positions of the tabs and receivers could be reversed. Tabs 18 may take a variety of different physical structures, including flanges, teeth, posts, or arm members 20, as are specifically shown in FIG. 3. Depending upon the nature and configuration of tabs 18, receivers 19 may also be of varying configurations. For example, where tabs 18 are in the form of arm members 20 as shown, receivers 19 will be in the form of notches or slots that are correspondingly shaped and dimensioned so as to permit arm members 20 to be received therein. Where tabs 18 are in the form of teeth, receivers 19 may be in the form of corresponding teeth. Where tabs 18 are in the form of posts and extend outwardly from backing plate 12 in the same direction as barrel 11, receivers 19 may be in the form of correspondingly shaped holes within cover ring 9, or may be in the form of slots or other openings into which the posts may be received. Other physical forms of tabs and receivers could equally be utilized while remaining within the nature of the invention.

As also specifically shown in the attached drawings, tabs 18 and receivers 19 are positioned about their respective backing plate and cover ring such that the cover ring may be rotated and "indexed" relative to backing plate 12 and held in a pre-determined orientation through the interaction of the tabs and receivers. The number, spacing and particular location of the tabs and receivers about backing plate 12 and cover ring 9 can thus be designed to permit cover ring 9 to be oriented in any one of a wide variety of different and discreet angular positions. For example, FIG. 5 illustrates two roller blind clutches mounted to an end bracket 16 wherein the tabs 18 of each backing plate 12 are positioned within receivers 19 of cover ring 9 in a manner that orients chain guides 3 in a vertical plane in each instance.

In contrast, FIG. 6 shows two roller blind clutches mounted to an end bracket 16 wherein the cover ring 9 of the upper clutch has been indexed relative to backing plate 12 such that tabs 18 of backing plate 12 engage a different set of receivers 19 in cover ring 9 than in the case of the lower clutch. The net effect is that the chain guide 3 of the upper clutch is off-set (in this case in a leftward or clockwise direction from a vertical plane). In so doing it will be appreciated that the chains or cords that extend downwardly from the upper clutch will be held in a vertical plane that is further offset from that of the lower clutch than would be the case of FIG. 5. Further, in FIG. 5 it will be appreciated that in some instances the chains or cords of the upper clutch may come into contact with the exterior surface of the lower clutch, whereas the offsetting or indexing of cover ring 9 in FIG. 6 helps to minimize that possibility. The nature of the indexing of cover ring 6 and backing plate 12 is such that the cover ring may be indexed in either a clockwise or a counter clockwise direction, and at a variety of different pre-determined angles.

The described structure not only permits the cover ring of a roller blind clutch to be indexed so that its chain guide can be offset from the vertical plane, but forming the clutch cover in two separate components, namely, the cover ring and the barrel portion (with the backing plate attached), permits the cover ring to be formed from a completely different material from that of the barrel portion. As mentioned, in order to accept the loading and the stresses that will be applied to the clutch during its operation the barrel portion must typically be formed from a relatively strong and thermal resistant material. In most instances those considerations do not apply to cover ring 9 as it does not come into contact with the primary components of the clutches drive mechanism, nor does it accept or transfer any of the torque from the clutch to the roller blind's end bracket. For that reason, the cover ring can potentially be formed from a less expensive material. The cover ring could also be formed from a material that is more flexibly resilient than that of the barrel portion such that should the clutch or the end of the roller blind be dropped the cover ring would be more capable of accepting any resulting impact load without damage or breakage. A separate and distinct clutch cover also presents a manufacturer with the ability to add colorant to the material from which the cover is formed, if desired.

Finally, a separate clutch cover also enables the manufacturer to manufacture the chain guide portion from a material that is less likely to cause excessive noise if it were to come into contact with the chain or cord during operation of the clutch.

It is to be understood that what has been described are the preferred embodiments of the invention. The scope of the claims should not be limited by the preferred embodiments set forth above, but should be given the broadest interpretation consistent with the description as a whole.

I claim:

1. A clutch cover for a roller blind clutch, the clutch cover comprising:
   a clutch barrel portion mounted upon and extending outwardly from a first side of a backing plate, one or more clutch mounts operatively associated with an opposite side of said backing plate for securing said clutch barrel portion to an end bracket,
   a cover ring, said cover ring including a chain guide, said cover ring releasably securable about said backing plate such that said cover ring encompasses said backing plate, and
   one or more indexing locators to fix the position of said cover ring relative to said backing plate, said indexing locators preventing relative rotational movement between said cover ring and said backing plate when said cover ring is releasably secured to said backing plate, said indexing locators permitting said chain guide to be positioned at a plurality of angles relative to said backing plate, said indexing locators including a plurality of tabs and a plurality of receivers, said tabs positioned on one of said backing plate and said cover ring, said receivers positioned on the other of said backing plate and said cover ring, said tabs releasably engagable with said receivers to locate and fix the position of said cover ring relative to said backing plate.

2. The clutch cover as claimed in claim 1 wherein said chain guide and said cover are of unitary construction.

3. The clutch cover as claimed in claim 2 wherein said receivers are notches or slots into which said tabs are received.

4. The clutch cover as claimed in claim 3 wherein said tabs are positioned on said backing plate and said notches or slots are positioned within said cover ring.

5. The clutch cover as claimed in claim 1 wherein said barrel portion and said backing plate are of unitary construction.

6. The clutch cover as claimed in claim 1 wherein said barrel portion and said backing plate are separate and distinct components, said barrel portion fixedly receivable upon said first side of said backing plate.

\* \* \* \* \*